US008268405B2

(12) United States Patent
Chen et al.

(10) Patent No.: US 8,268,405 B2
(45) Date of Patent: Sep. 18, 2012

(54) CONTROLLED DECORATION OF CARBON NANOTUBES WITH AEROSOL NANOPARTICLES

(75) Inventors: Junhong Chen, Kenosha, WI (US); Ganhua Lu, Milwaukee, WI (US)

(73) Assignee: UWM Research Foundation, Inc., Milwaukee, WI (US)

( * ) Notice: Subject to any disclaimer, the term of this patent is extended or adjusted under 35 U.S.C. 154(b) by 499 days.

(21) Appl. No.: 11/508,687

(22) Filed: Aug. 23, 2006

(65) Prior Publication Data

US 2012/0207938 A1 Aug. 16, 2012

Related U.S. Application Data

(60) Provisional application No. 60/710,642, filed on Aug. 23, 2005.

(51) Int. Cl.
*B05D 1/16* (2006.01)

(52) U.S. Cl. ......... 427/465; 427/569; 427/561; 427/485

(58) Field of Classification Search ........................ None
See application file for complete search history.

(56) References Cited

U.S. PATENT DOCUMENTS 5,460,701 A * 10/1995 Parker et al. .................. 204/164
5,514,349 A * 5/1996 Parker et al. ............. 422/186.21
5,788,738 A 8/1998 Pirzada et al.
5,851,507 A * 12/1998 Pirzada et al. ................ 423/659
5,874,684 A * 2/1999 Parker et al. .................... 75/228
5,905,000 A 5/1999 Yadav et al.
5,939,146 A 8/1999 Lavernia
5,952,040 A 9/1999 Yadav et al.
5,984,997 A 11/1999 Bickmore et al.
5,989,648 A 11/1999 Phillips
6,113,795 A * 9/2000 Subramaniam et al. ...... 210/651
6,228,904 B1 5/2001 Yadav et al.
6,254,940 B1 * 7/2001 Pratsinis et al. .............. 427/562
6,268,054 B1 7/2001 Costantino et al.
6,379,419 B1 * 4/2002 Celik et al. ....................... 75/346
6,447,848 B1 9/2002 Chow et al.
6,528,020 B1 3/2003 Dai et al.
6,528,029 B1 3/2003 Dettling et al.
6,548,171 B1 4/2003 Barbera-Guillem et al.
6,623,559 B2 * 9/2003 Huang ............................ 117/87
6,652,967 B2 11/2003 Yadav et al.

(Continued)

FOREIGN PATENT DOCUMENTS

WO 01/44796 6/2001

OTHER PUBLICATIONS

Zhu, A Generic Approach to Coat Carbon Nanotubes With Nanoparticles for Potential Energy Applications. Apr. 2008, Journal of Heat Transfer, vol. 130.*

(Continued)

*Primary Examiner* — David E Graybill
(74) *Attorney, Agent, or Firm* — Michael Best & Friedrich LLP

(57) ABSTRACT

The present invention addresses the problem of conveniently and efficiently decorating nanostructures such as carbon nanotubes with aerosol nanoparticles using electrostatic force directed assembly ("ESFDA"). ESFDA permits size selection as well as control of packing density spacing of nanoparticles. ESFDA is largely material independent allowing different compositions of such nanoparticle-nanotube structures to be produced.

3 Claims, 3 Drawing Sheets

U.S. PATENT DOCUMENTS

| | | | |
|---|---|---|---|
| 6,726,992 | B1 | 4/2004 | Yadav et al. |
| 6,730,537 | B2* | 5/2004 | Hutchison et al. ............... 438/99 |
| 6,765,949 | B2* | 7/2004 | Chang ................................ 373/2 |
| 6,777,639 | B2* | 8/2004 | Schroder et al. .......... 219/121.59 |
| 6,855,426 | B2 | 2/2005 | Yadav |
| 6,872,971 | B2* | 3/2005 | Hutchinson et al. ............. 257/40 |
| 6,933,331 | B2 | 8/2005 | Yadav et al. |
| 7,012,214 | B2* | 3/2006 | Schroder et al. .......... 219/121.36 |
| 7,126,081 | B2* | 10/2006 | Schroder et al. .......... 219/121.59 |
| 7,172,790 | B2* | 2/2007 | Koulik et al. .................. 427/212 |
| 7,223,444 | B2* | 5/2007 | Deppert et al. ................ 427/466 |
| 7,232,771 | B2* | 6/2007 | Jacobs et al. .................. 438/758 |
| 7,318,908 | B1 | 1/2008 | Dai |
| 7,326,954 | B2* | 2/2008 | Wybourne et al. ............... 257/40 |
| 7,335,908 | B2* | 2/2008 | Samuelson et al. .............. 257/12 |
| 7,416,699 | B2 | 8/2008 | Dai et al. |
| 7,442,573 | B2* | 10/2008 | Hutchison et al. ............... 438/99 |
| 7,528,002 | B2* | 5/2009 | Samuelson et al. .............. 438/94 |
| 7,531,136 | B2 | 5/2009 | Besnard et al. |
| 7,955,559 | B2 | 6/2011 | Joshi et al. |
| 2002/0016306 | A1* | 2/2002 | Hutchison et al. ............... 514/44 |
| 2002/0117659 | A1 | 8/2002 | Lieber et al. |
| 2002/0146742 | A1* | 10/2002 | Wybourne et al. .............. 435/7.1 |
| 2003/0077625 | A1* | 4/2003 | Hutchison ......................... 435/6 |
| 2003/0102444 | A1* | 6/2003 | Deppert et al. ........... 250/492.22 |
| 2003/0147966 | A1* | 8/2003 | Franzen et al. ................ 424/491 |
| 2003/0230554 | A1* | 12/2003 | Schroder et al. .......... 219/121.59 |
| 2004/0018306 | A1* | 1/2004 | Tenne et al. ............... 427/255.28 |
| 2004/0052289 | A1* | 3/2004 | Chang .............................. 373/60 |
| 2004/0057896 | A1* | 3/2004 | Kronholm et al. ............. 423/461 |
| 2004/0065170 | A1* | 4/2004 | Wu et al. ........................ 75/10.13 |
| 2004/0075464 | A1* | 4/2004 | Samuelson et al. ............. 326/37 |
| 2004/0105980 | A1* | 6/2004 | Sudarshan et al. ............. 428/404 |
| 2004/0166673 | A1* | 8/2004 | Hutchison et al. ............ 438/686 |
| 2004/0178530 | A1 | 9/2004 | Yadav |
| 2004/0202682 | A1* | 10/2004 | Emrick et al. ................. 424/400 |
| 2004/0221813 | A1* | 11/2004 | Chang ........................ 118/723 E |
| 2005/0000950 | A1* | 1/2005 | Schroder et al. .......... 219/121.59 |
| 2005/0008861 | A1* | 1/2005 | Yadav et al. ................... 428/403 |
| 2005/0011431 | A1* | 1/2005 | Samuelson et al. .............. 117/40 |
| 2005/0061785 | A1* | 3/2005 | Schroder et al. .......... 219/121.56 |
| 2005/0147747 | A1 | 7/2005 | Yadav |
| 2005/0181587 | A1* | 8/2005 | Duan et al. ..................... 438/551 |
| 2005/0199861 | A1* | 9/2005 | Wu et al. ...................... 252/518.1 |
| 2006/0019470 | A1* | 1/2006 | Seifert et al. .................. 438/483 |
| 2006/0057360 | A1* | 3/2006 | Samuelson et al. ............ 428/323 |
| 2006/0063299 | A1* | 3/2006 | Hutchison et al. ............... 438/99 |
| 2006/0081835 | A1* | 4/2006 | Hutchison et al. ............... 257/17 |
| 2006/0083694 | A1* | 4/2006 | Kodas et al. .................... 424/46 |
| 2006/0125056 | A1* | 6/2006 | Samuelson et al. ............ 257/613 |
| 2006/0159596 | A1* | 7/2006 | De La Veaux et al. ........ 422/151 |
| 2006/0204441 | A1* | 9/2006 | Atala et al. ..................... 424/9.6 |
| 2006/0204445 | A1* | 9/2006 | Atala et al. ................... 424/9.36 |
| 2006/0204539 | A1* | 9/2006 | Atala et al. ..................... 424/423 |
| 2007/0141163 | A1* | 6/2007 | Vitaliano et al. ............... 424/490 |
| 2007/0193518 | A1* | 8/2007 | Shiina et al. ............... 118/723 R |
| 2007/0262482 | A1* | 11/2007 | Halpap et al. .................... 264/10 |
| 2007/0272664 | A1* | 11/2007 | Schroder et al. .......... 219/121.59 |
| 2008/0142361 | A1 | 6/2008 | Han et al. |
| 2008/0142926 | A1* | 6/2008 | Seifert et al. .................. 257/615 |
| 2009/0084163 | A1 | 4/2009 | Chen et al. |

OTHER PUBLICATIONS

Alivisatos, A.P., "Semiconductor clusters, nanocrystals, and quantum dots," Science (1996) 271:933-937.

Banerjee, S. et al., "Synthesis and characterization of carbon nanotube-nanocrystal heterostructures," Nano Lett. (2002) 2:195-200.

Che, G.L. et al., "Carbon nanotubule membranes for electrochemical energy storage and production," Nature (1998) 393:346-349.

Chen, J.H. et al., "A simple and versatile mini-arc plasma source for nanocrystal synthesis," J. Nano Res. (2007) 9(2):203-213.

Chen, J.H. et al., "Model of the negative DC corona plasma: comparison to the positive DC corona plasma," Plasma Chem. Plasma Process. (2003) 23(1):83-102.

Chen, J. et al., "Controlled decoration of carbon nanotubes with nanoparticles," Nanotechnology (2006) 17:2891-2894.

Chen, R.J. et al., "Noncovalent functionalization of carbon nanotubes for highly specific electronic biosensors," Proc. Natl. Acad. Sci. USA (2003) 100(9):4984-4989.

Choi, H.C. et al., "Spontaneous reduction of metal ions on the sidewalls of carbon nanotubes," J. Am. Chem. Soc. (2002) 124:9058-9059.

Collins, P.C. et al., "Engineering carbon nanotubes and nanotube circuits using electrical breakdown," Science (2001) 292:706-709.

Dresselhaus, M.S. et al., "Phonons in carbon nanotubes," Adv. Phys. (2000) 49(6):705-814.

Fu, Q. et al., "Selective coating of single wall carbon nanotubes with thin SiO2 layer," Nano Lett. (2002) 2(4):329-332.

Han, L. et al., "A direct route toward assembly of nanoparticle-carbon nanotube composite materials," Langmuir (2004) 20(14):6019-6025.

Han, W.Q. et al., "Coating single-walled carbon nanotubes with tin oxide," Nano Lett. (2003) 3(5):681-683.

Haremza, J.M. et al., "Attachment of single CdSe nanocrystals to individual single-walled carbon nanotubes," Nano Lett. (2002) 2(11):1253-1258.

Hu, J.T. et al., "Controlled growth and electrical properties of heterojunctions of carbon nanotubes and silicon nanowires," Nature (1999) 399:48-51.

Jacobs, H.O. et al., "Approaching nanoxerography: the use of electrostatic forces to position nanoparticles with 100 nm scale resolution," Adv. Mater. (2002) 14(21):1553-1557.

Jiang, K.Y. et al., "Selective attachment of gold nanoparticles to nitrogen-doped carbon nanotubes," Nano Lett. (2003) 3(3):275-277.

Kneipp, K. et al., "Surface-enhanced and normal Stokes and anti-Stokes Raman spectroscopy of single-walled carbon nanotubes," Phys. Rev. Lett. (2000) 84(15):3470-3473.

Kong, J. et al., "Functionalized carbon nanotubes for molecular hydrogen sensors," Adv. Mater. (2001) 13(18):1384-1386.

Krinke, T.J. et al., "Microscopic aspects of the deposition of nanoparticles from the gas phase," J. Aerosol Sci. (2002) 33(10):1341-1359.

Krinke, T.J. et al., "Positioning of nanometer-sized particles on flat surfaces by direct deposition from the gas phase," Appl. Phys. Lett. (2001) 78(23):3708-3710.

Kuznetsova, A. et al., "Oxygen-containing functional groups on single-wall carbon nanotubes: NEXAFS and vibrational spectroscopic studies," J. Am. Chem. Soc. (2001) 123(43):10699-10704.

Liu, J. et al., "Fullerene pipes," Science (1998) 280:1253-1256.

Liu, J. et al., "Recent advances in methods of forming carbon nanotubes," MRS Bull. (2004) 29:244-250.

Liu, Y-L. et al., "Gas sensing properties of tin dioxide coated onto multi-walled carbon nanotubes," Thin Solid Films (2006) 497:355-360.

Lu, G. et al., "Gas sensors based on tin oxide nanoparticles synthesized from a mini-arc plasma source," J. Nanomatls. (2006) 1-7.

Lu, G. et al., "Toward novel gas sensors based on hybrid nanostructures," Abstract of 2006 MRS Fall Meeting, Boston, MA Nov. 27-Dec. 1, 2006.

Lu, G. et al., "Room temperature gas sensing with SnO2 nanocrystals supported on MWCNTs," Talk at University of Milwaukee on Aug. 28, 2007, 20 pages.

Luo, J. et al., "Thermal activation of molecularly-wired gold nanoparticles on a substrate as catalyst," J. Am.Chem. Soc. (2002) 124(47):13988-13989.

Murray, C.B. et al., "Synthesis and characterization of nearly monodisperse CdE (E=sulfur, selenium, tellurium) semiconductor nanocrystallites," J. Am. Chem. Soc. (1993) 115(19):8706-8715.

Star, A. et al., "Gas sensor array based on metal-decorated carbon nanotubes," J. Phys. Chem. B. (2006) 110;21014-21020.

Suehiro, J. et al., "Fabrication of a carbon nanotube-based gas sensor using dielectrophoresis and its application for ammonia detection by impedance spectroscopy," J. Phys. D: Appl. Phys. (2003) 36:L109-L114.

Tang, Z.Y. et al., "One-dimensional assemblies of nanoparticles: preparation, properties and promise," Adv. Mater. (2005) 17:951-962.

Tsai, D.H. et al., "Electrostatic-directed deposition of nanoparticles on a field generating substrate," Nanotechnology (2005) 16:1856-1862.

Yildirim, T. et al., "Titanium-decorated carbon nanotubes as a potential high-capacity hydrogen storage medium," Phys. Rev. Lett. (2005) 94:175501-175505.

United States Patent Office Action for U.S. Appl. No. 12/199,891 dated Mar. 30, 2011 (10 pages).
United States Patent Office Action for U.S. Appl. No. 12/199,891 dated Oct. 11, 2011 (9 pages).
United States Patent Office Action for U.S. Appl. No. 12/199,891 dated Feb. 2, 2012 (10 pages).

* cited by examiner

CONTROLLED DECORATION OF CARBON NANOTUBES WITH AEROSOL NANOPARTICLES

CROSS REFERENCE TO RELATED APPLICATIONS

This application claims the benefit of U.S. provisional application 60/710,642 filed on Aug. 23, 2005, hereby incorporated by reference.

STATEMENT REGARDING FEDERALLY SPONSORED RESEARCH

N/A

BACKGROUND OF THE INVENTION

The present invention relates to the assembly of nanoparticles, and, in particular, to a method of using electrostatic force to assemble nanoparticles onto nanostructures.

The manufacture of nanostructures from carbon nanotubes and nanoparticles may be useful in a broad range of applications including: nanoelectronics, chemical sensors, biosensors, catalysis, fuel cells, and hydrogen storage. Current methods for assembling these components are primarily based on "wet-chemical" techniques in which the components are created or manipulated with chemical reactions taking place in solution. These methods, however, are generally very slow and the associated interfacial chemistry is material dependent, limiting their ability to create nanostructures of arbitrary composition. Furthermore, although the size of the nanoparticles may be controlled in the solution prior to assembly, there is very limited control over the assembly process.

SUMMARY OF THE INVENTION

The present invention addresses the problem of conveniently and efficiently decorating both single-walled and multi-walled carbon nanotubes with nanoparticles by using electrostatic force directed assembly ("ESFDA"). Using ESFDA, the packing density, spacing, and size distribution of nanoparticles on nanotubes can be controlled during the assembly process. Due to the inherent material independent nature of electrostatic force, nanoparticle-nanotube structures can be produced from a variety of different materials and different combinations of materials.

Specifically then, the present invention provides a method of coating various nanostructures with a variety of nanoparticles in which a plurality of electrically conductive nanostructures is created. A plurality of charged aerosol nanoparticles is then produced, and an electrical field is applied to the nanostructures. The charged nanoparticles introduced to the electrical field are then attracted to the nanostructures and bond to the nanostructures.

Thus, it is an object of at least one embodiment of the present invention to provide a simple method of assembling nano-sized particles into structures without the need for a liquid environment.

It is another object of the invention to provide an assembly technique that is largely indifferent to the chemical composition of the nanoparticles and nanostructures and that thus may be used to assemble a variety of novel structures of arbitrary composition.

The nanostructures may be either single-walled or multi-walled in nature.

The bonding between the nanostructures and nanoparticles may be non-covalent in nature so as to preserve the $sp^2$ hybridization of carbon atoms.

It is thus another object of the invention to preserve desirable electronic properties of carbon in the nanostructure.

The assembly time may be controlled so as to control the packing density of the nanoparticles on the nanostructures. In addition or alternatively, the aerosol flow rate and/or electrical field may also be controlled so as to control the size of the nanoparticles that attach to the nanostructures.

Thus, it is yet another object of at least one embodiment of the present invention to provide an assembly technique that allows multidimensional control of the assembly process.

The nanostructures used in the invention may be nanotubes.

Thus, it is another object of at least one embodiment of the present invention that the nanoparticles introduced to the electrical field may comprise a mixture of two different types of nanoparticles.

It is thus another object of the invention to provide an assembly method that may work with multiple nanoparticles of different chemical compositions.

Thus, it is another object of at least one embodiment of the present invention that the nanoparticles used are catalysts, photoelectric materials, or semiconductors.

It is thus another object of the invention to provide an assembly technique that by allowing great flexibility in the types and composition of nanoparticles being used is widely applicable to applications such as: filtration, sensing, purification, generation of materials, catalyzation, hydrogen storage, fuel cell components, discharge electrodes, spintronics, Raman scattering, wave guides, solar energy harvesting, nanometrology, and marking the nanostructure to study nanomechanics.

The assembled nanoparticles and nanostructure may be attached to a substrate and the nanostructure removed to transfer the nanoparticles to the substrate.

Thus, it is another object of the invention to provide a method of organizing nanoparticles on a microscopic scale for transfer to another object. A carbon nanotube used as the substrate organizes the nanoparticles along one dimension, while mutual electrostatic repulsion of the nanoparticles organizes them with a regular spacing defined by the number of nanoparticles deposited.

The above method may be used to produce a sensing electrode having a conductive nanowire extending between a first and second electrode to conduct electricity therethrough and nanoparticles of a different material than the conductive nanowire responsive to an environment of the conductive nanowire to change the properties of conduction of the conductive nanowire.

Thus, it is another object of at least one embodiment of the invention to provide a novel sensing device making use of the ability to attached materials of arbitrary composition, in a regular manner, to a conductive nanowire.

These particular objects and advantages may apply to only some embodiments falling within the claims and thus do not define the scope of the invention.

BRIEF DESCRIPTION OF THE DRAWINGS

FIG. 1 is a schematic representation of the electrostatic assembly apparatus of the present invention showing a nanoparticle generating arc and a carrier gas system flowing aerosol nanoparticles over a grid of nanotubes charged to attract and bond to the nanoparticles;

DETAILED DESCRIPTION

Figure 1:
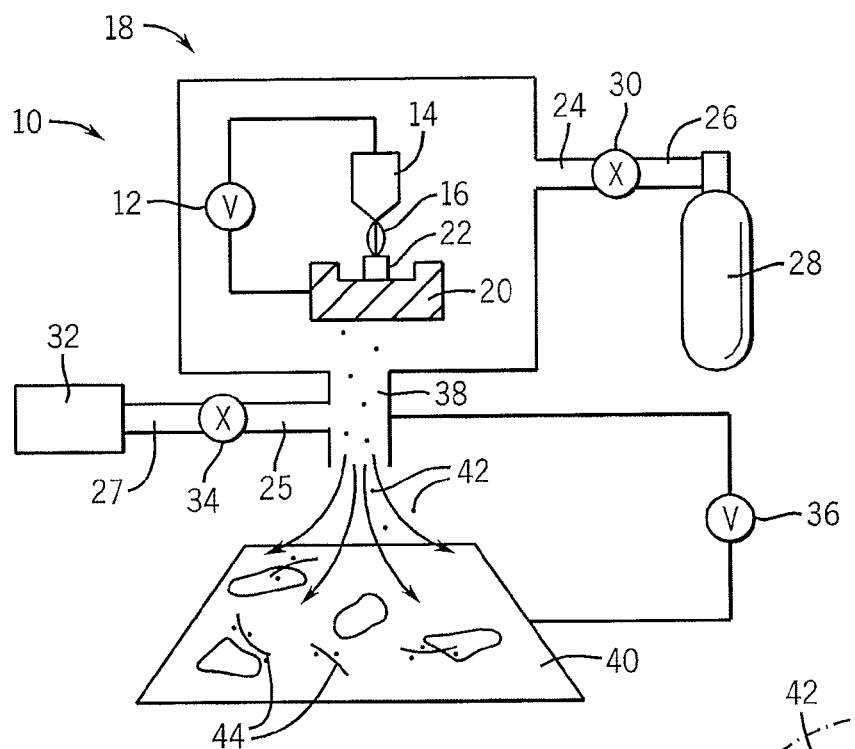

Referring to FIG. 1, an electrostatic force directed assembly (ESFDA) device 10 provides an arc plasma source chamber 18 enclosing an arc cathode 14 opposed to an arc anode 20, the later holding a precursor material 22 from which nanoparticles will be created. A plasma arc voltage source 12 couples the arc anode 20 to the arc cathode 14 to create the arc 16 which strikes the precursor material 22 for the production of the nanoparticles 42. The arc cathode 14 and arc anode 20 may be, for example, tungsten and graphite respectively.

The application of the arc 16 to the precursor material 22 creates an aerosol of nanoparticles 42 through physical vaporization of the solid precursor material 22. This generation of nanoparticles creates a relatively broad size distribution of nanoparticles 42. A significant fraction of the nanoparticles 42 are charged by the arc 16 or through plasma or thermionic emission, which makes ESFDA feasible without the use of further nanoparticle 42 charging device. The charging of the nanoparticles 42 may prevent their agglomeration. Alternatively, the nanoparticle 42 production means may use aerosol reactors or may aerosolize colloidal nanoparticles 42, in which case additional charging means may be required in such assemblies, or example using corona discharge electrodes.

Multiple precursor materials 22 may be used, for example, silver (Ag) and tin oxide ($SnO_2$) for example from different arc assemblies or using a mixture of precursor materials 22. The gaseous aerosol may thus comprise a mixture different nanoparticles 42, including generally catalysts, photo-catalysts, or semiconductors. The nanoparticles 42 will typically be less than 100 nanometers in diameter and may have a mean diameter of less than 20 nanometers.

The ESFDA device 10 further provides a room temperature carrier gas source 28 that is connected to the plasma source chamber 18 by way of a first inlet tube 26 and a second inlet tube 24. The first and second inlet tubes are coupled together by a metering valve or flow meter 30 so that flow of the gas into the chamber 18 may be precisely controlled. The gas from the carrier gas source 28 is applied to the chamber 18 to carry the nanoparticles 42 created by the arc plasma source down a flow tube 38. The flow tube 38 generally acts as an electrode and may comprise grounded metal conductor. A bypass tube 25 branches from the flow tube to the flow out of the flow tube 38 independent of the flow of carrier gas into the chamber 18. The bypass tube 25 leads to a metering valve 34 and then connects to an exhaust tube 27 leading to a filter 32 disposed at the end of the exhaust tube 27 to catch any nanoparticles 42 that are diverted from the flow tube 38.

A substrate electrode 40 is provided beneath the flow tube 38 and a voltage source 36 is connected between the substrate electrode 40, and the flow tube 38 to provide an electrical field therebetween. The voltage source 36 may be either positive or negative in nature, depending on the charge of the nanoparticles, so as to attract the nanoparticles to the substrate electrode 40. Supported by the substrate electrode 40 and in electrical communication with the substrate electrode 40, are nanostructures 44 to which the nanoparticles will be assembled. In one embodiment, the nanostructures 44 are carbon nanotubes (CNT) coating a substrate electrode 40 that is a perforated copper grid. The holes in the grid appear to enhance the effect of the electrical field. A gap distance (e.g., 2-0.5 mm) is maintained between the metal flow tube 38 and the substrate electrode 40 using, for example, a precision-machined ceramic spacer. The larger the gap between the flow tube 38 and the substrate electrode 40, the higher applied voltage necessary to sufficiently attract the nanoparticles 42 to the nanostructures 44.

The presence of the voltage source 36 creates an electrical field in the neighborhood of the nanostructures 44 on the substrate electrode 40. Thus, after the nanoparticles 42 flow through the flow tube 38, they are preferentially attracted to the nanostructure 44 surfaces on the substrate electrode 40. This attraction results in nanoparticle 42 decoration of the nanostructures 44, which will be discussed further below. The voltage source may provide a voltage of 2 kV-500 V depending on the gap distance. The voltage is limited only by the breakdown voltage of the carrier gas (about $3 \times 10^6$ V/m for dry air). Calculation from experiments show the maximum electric field near the surface of a 20-nm carbon nanotube reaches $2.45 \times 10^6$ V/m for a voltage source 36 of 2 kV and a gap of 2 mm.

In the absence of an electrical field, it has been determined that the nanoparticles 42 are not appreciably attracted to the nanostructures 44 and do not bond to the surfaces of the nanostructures.

Various different nanostructures 44 such as carbon nanotubes, nanorings, nanorods, and nanowires may be used in the present invention. The nanostructures 44 are produced using known methods in the relevant technological field or, alternatively, may be bought from known commercial sources, e.g., Carbon Nanotechnologies, Inc. and Alfa Aesar.

Figure 2:
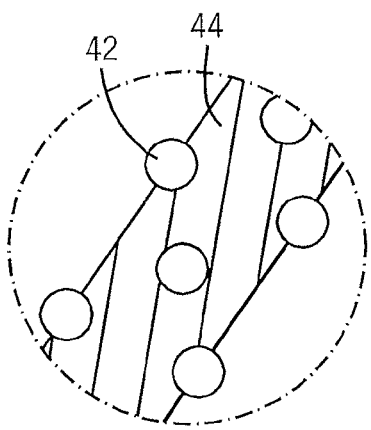
FIG. 2 is a simplified depiction of a TEM image of the assembled nanostructures of FIG. 1.

Referring now to FIG. 2 a cross-sectional simplified TEM image of a nanostructure 44 shows its surface decorated with a plurality of nanoparticles 42. The nanoparticles 42 are bonded to the exterior surface of the nanostructures 44. The adhesion between the nanoparticles 42 and the nanostructures 44 appears to be non-covalent in nature and thus preserves the $sp^2$ hybridization of the carbon atoms in that may be present in the nanostructures 44. By maintaining this $sp^2$ hybridization, the unique intrinsic properties of the nanostructures 44 are preserved. The bonding between the nanostructures 44 and nanoparticle 42 may provide for good electrical conduction between the two.

The nanoparticles 42 are generally evenly spaced across the external surface of the nanostructure 44 because of the electrical charge carried on each of the nanoparticles 42 which cause them to mutually repel one another leading to a minimum energy configuration of substantially uniform distribution.

The average separation of the nanoparticles 42 bonded to the external surfaces of the nanostructures 44 can be controlled by adjusting the assembly conditions. For example, adjusting the duration of the flow of nanoparticles 42 over the substrate electrode 40 will control the packing density of the nanoparticles 42 on the nanostructures 44 as the packing density increases with increased assembly time. If the assembly time is sufficiently long, the entire surface of the nanostructure 44 may be coated with nanoparticles 42.

Figure 3:
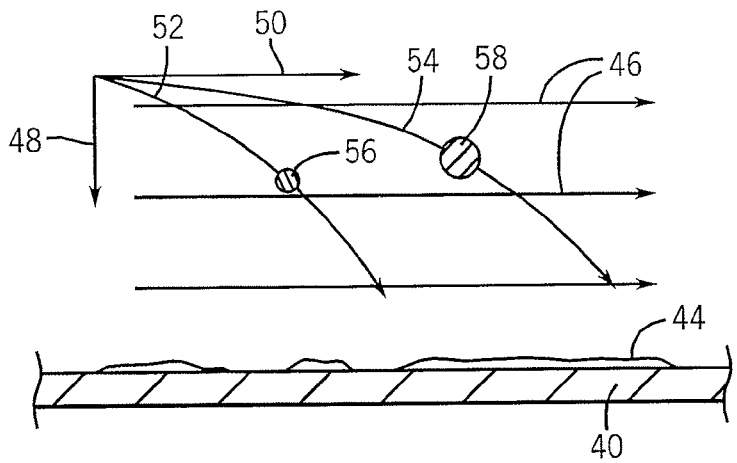
FIG. 3 is a cross-sectional elevation view of the flow of nanoparticles over the nanostructures per FIG. 1 showing the perpendicular forces of gas flow and electrostatic attraction that can be used to sort nanoparticle size.

Referring now to FIG. 3, similarly, controlling the flow rate of the nanoparticles 42 or the strength of the electrical field will control the size of the nanoparticles 42 assembled on the nanostructures 44. As the nanoparticles 42 approach the substrate electrode 40, they are held in a laminar flow represented by flow lines 46 applying an airflow force 50 on the nanoparticles 56 and 58 that is dependant on the size of the nanoparticles 56 and 58. In contrast, an electrostatic force 48 perpendicular to the airflow force 50 and toward the substrate is dependent on the charge of the nanoparticles 56 and 58 which will be largely independent of their size. These competing forces create trajectory lines 52 and 54 that sort nanoparticles 42 of different sizes. Trajectory line 52 is traveled by representative small nanoparticle 56 and depicts the result of a proportionally larger electrostatic force 48 than airflow force 50 while trajectory line 54 is traveled by relatively larger nanoparticle 58 represents a proportionally smaller electrostatic force 48 than airflow force 50. Larger nanoparticles 58 tend to be carried along further by the airflow force 50 due to their size relative to that of the smaller nanoparticles 56 allowing size distribution to be controlled. Nanoparticle size can affect the properties of the nanoparticles 42.

To the extent that the amount of charge can be controlled on different nanoparticles 42, this same effect may be used to sort nanoparticle materials or provide different size ratios among nanoparticles 42 of different materials.

Nanoparticles 42 reaching the nanostructures 44 are selected through their electrical mobility, the ability of a particle to move in an electrical field, characterized by the following equation: $Z_p=v_p/E=neC_c/3\pi\mu D_p$, wherein $v_p$ is the nanoparticle 42 velocity along electric field lines, $E$ is the electrical field, n is the number of elementary charges carried by nanoparticles, e is the elementary charge, $C_c$ is the Cunningham slip correction factor, $D_p$ is the diameter of the nanoparticles, and $\mu$ is the flow viscosity. The electric field need not be homogenous but can be further altered to control the distribution of the particles for example with electrode shapes, shields or photoelectric dissipation.

Some size selection is also intrinsic to the process of generating and conveying the aerosolized nanoparticles 42.

Figure 4:
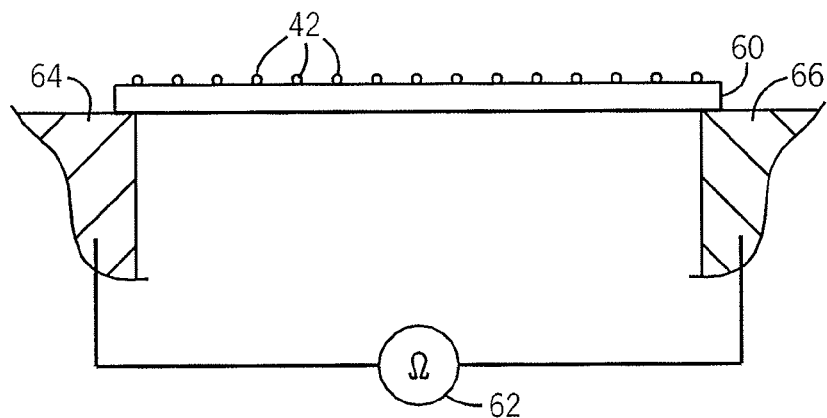
FIG. 4 is an elevation view of a nanotube disposed between electrodes and having reactive nanoparticles on its surface to provide a novel sensing electrode.
Figure 5A:
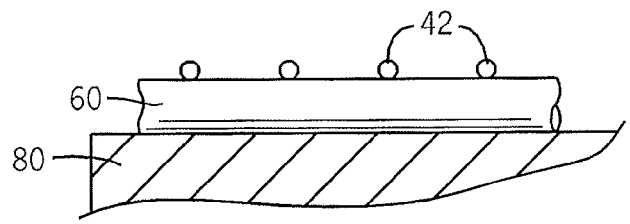
FIGS. 5a and 5b are elevation fragmentary views of an assembled nanotube and nanoparticles showing steps of destroying the nanotube to transfer the ordered nanoparticles to a secondary substrate.
Figure 5B:
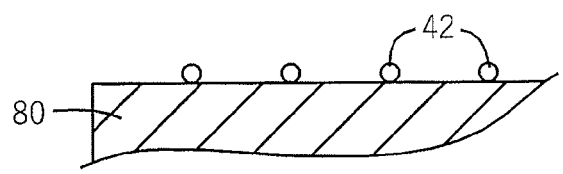
Figure 6:
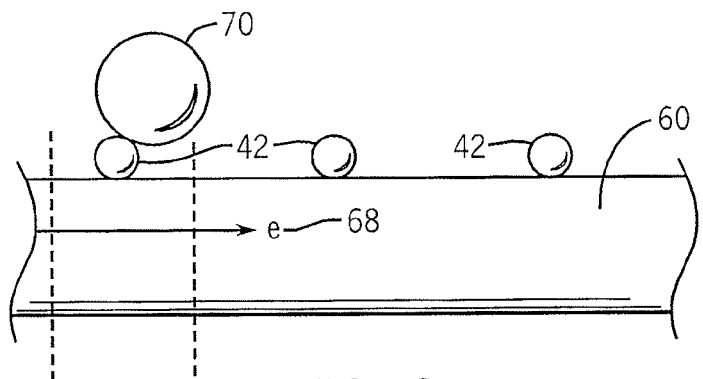
FIG. 6 is a fragmentary view similar to that of FIGS. 4 and 5 showing a sensor in which nanoparticles attracting environmental agents, affect current flow in the underlying nanotube to create a sensor.
Figure 7:
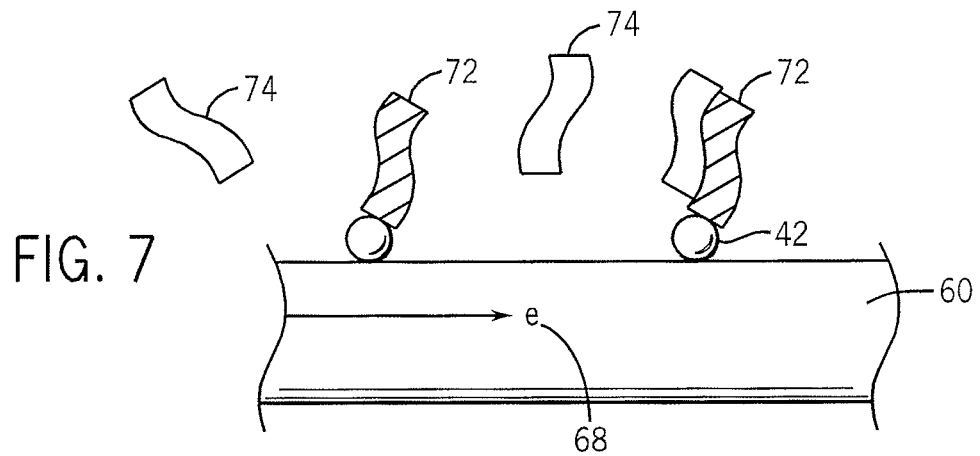
FIG. 7 is a fragmentary view similar to that of FIG. 6 showing the same principle used to detect complex molecules such as DNA or RNA.
Figure 8:
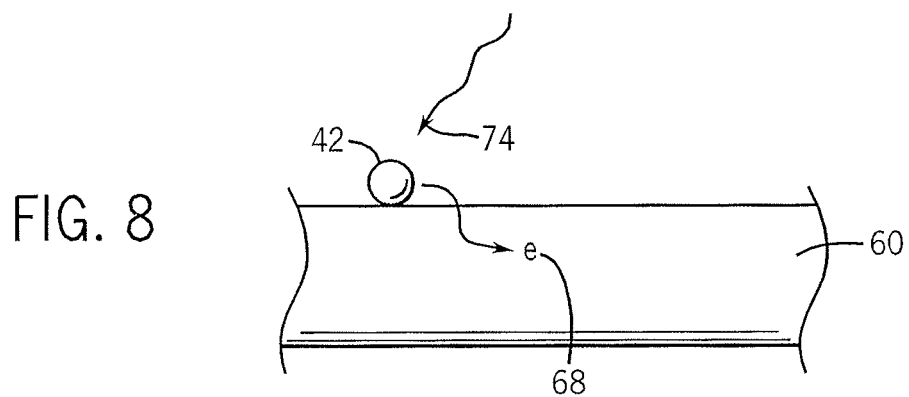
FIG. 8 is a fragmentary view similar to that of FIG. 7 showing the structure sued as a photocell or light sensor by providing a closely coupled path between a photoelectric material and a conductive wire.
Figure 9:
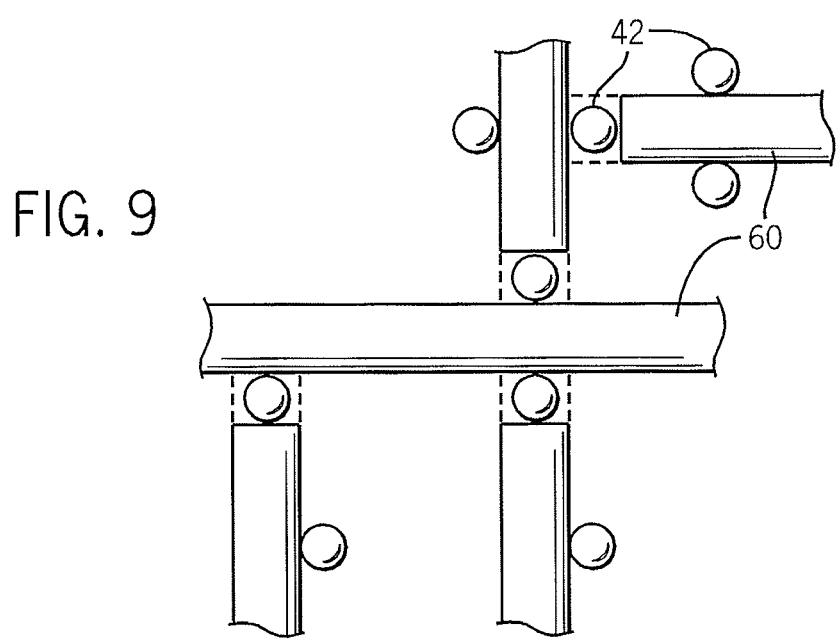
FIG. 9 is a fragmentary elevation view of a complex nanotube structure generated by seeding nanotubes with catalyst nanoparticles to create sites from which other nanotubes can be grown.

Referring now to FIG. 4, the present invention may be used to construct a novel device in which a single nanotube 60 is disposed between a first electrode 64 and a second electrode 66. An ohmmeter 62 or similar current sensitive device is placed between the two electrodes to measure the resistance of the nanotube 60. Nanoparticles 42 are lined up across the surface of the nanotube 60 using the assembly procedure discussed herein. Alternatively, the nanotube 60 could be replaced by another type of conductive nanostructure 44.

As shown in FIG. 6, the nanoparticles 42 may be selected to attract other particles 70 in the environment and bond to them. This bonding creates a region of increased resistance along the nanotube 60 that may be measured by the ohmmeter 62 (shown in FIG. 4) to detect the presence of the particles 70.

As shown in FIG. 7, in an alternative embodiment, strands of nucleotides 72 may be attached to the nanoparticles (before or after assembly) to hybridize with complimentary nucleotides 74 in the environment. Again, the result of this bonding of nucleotides 74 may be detected in changes in the flow of electrons 68 within the nanotube 60 near the bonded nucleotides 72. This particular embodiment is useful in the field of biosensors sensitive to the presence of a particular biological agent. The nucleotide 72 is selected to bond only to the particular agent to be detected.

Referring to FIG. 8, a photoelectric nanoparticle 42 attached to the surface of a carbon nanotube 60 may be struck by a light ray 74 to eject electrons 68 collected by the nanotube 60 to create an improved photocell or photo sensor.

Referring now to FIGS. 5*a* and 5*b*, a carbon nanotube 60 is placed on the surface of a substrate 80. Using the disclosed assembly procedure, nanoparticles 42 are lined up across the surface of the nanotube 60. By applying a high voltage or heat or oxidizing chemical to the nanotube 60, the nanotube 60 can be destroyed leaving behind only the nanoparticles 42 which remain lined up in a row on the substrate as shown in FIG. 5*b*. This technique can be used with conductive or semiconductive nanoparticles 42 to create fine conductive or semiconductive paths (for example, for integrated circuits) or to create fiducial marks on the substrate 80 for studies of microscopic strain or the like.

Referring now to FIG. 9 the nanoparticles 42 may be a catalyst that is used to grow additional nanotubes 60 branching from the nanotubes 60 on which the nanoparticles 42 were originally deposited. The resultant structure may have a relatively large surface area while having a relatively small volume and may, in turn, be coated with different nanoparticles 42 to provide for catalytic structures, photocells, or filters or the like.

Various alternatives are contemplated as being within the scope of the following claims, particularly pointing out and distinctly claiming the subject matter regarded as the invention.

We claim:

1. A method of coating nanostructures with nanoparticles comprising the steps of:
- (a) producing non-agglomerated charged nanoparticles from a precursor material using a plasma arc, wherein the precursor material is in contact with an arc anode;
- (b) applying an electrical field to an electrically conductive nanostructure;
- (c) carrying the charged nanoparticles down a flow tube from the plasma arc with a gas to the electrically conductive nanostructure; and
- (d) applying the charged nanoparticles to the electrical field so that they are attracted to and bond to the electrically conductive nanostructure, wherein the electrically conductive nanostructure is supported by and in electrical communication with a perforated grid.

2. The method of claim 1, wherein the perforated grid comprises copper.

3. The method of claim 1, wherein the electrically conductive nanostructure is a carbon nanotube having an axial dimension, and wherein the axial dimension is parallel to the plane of the perforated grid.

* * * * *